(12) United States Patent
Brandt et al.

(10) Patent No.: US 9,682,361 B2
(45) Date of Patent: Jun. 20, 2017

(54) ADSORBENT GRANULATE AND METHOD FOR THE MANUFACTURE THEREOF

(71) Applicant: CHEMIEWERK BAD KÖSTRITZ GMBH, Bad Köstritz (DE)

(72) Inventors: Alfons Brandt, Gera (DE); Jens Schmeisser, Kretzschau (DE); Baldur Unger, Dessau (DE); Hartmut Tschritter, Gera (DE); Uwe Henkel, Gera (DE); Gojdár Bálint, Bad Köstritz (DE); Dietmar Gruhle, Gera (DE); Georg Winterstein, Bad Klosterlausnitz (DE)

(73) Assignee: CHEMIEWERK BAD KOSTRITZ GMBH, Bad Kostritz (DE)

( * ) Notice: Subject to any disclaimer, the term of this patent is extended or adjusted under 35 U.S.C. 154(b) by 0 days.

(21) Appl. No.: 14/094,448

(22) Filed: Dec. 2, 2013

(65) Prior Publication Data

US 2014/0086817 A1    Mar. 27, 2014

Related U.S. Application Data

(62) Division of application No. 12/920,742, filed as application No. PCT/EP2009/052385 on Feb. 27, 2009, now abandoned.

(30) Foreign Application Priority Data

Mar. 3, 2008    (DE) .......................... 10 2008 012 346
Sep. 6, 2008    (DE) .......................... 10 2008 046 155

(51) Int. Cl.
| | | |
|---|---|---|
| *B01J 29/06* | (2006.01) | |
| *B01J 20/18* | (2006.01) | |
| *B01J 20/12* | (2006.01) | |
| *B01D 53/02* | (2006.01) | |

(52) U.S. Cl.
CPC .............. *B01J 20/12* (2013.01); *B01D 53/02* (2013.01); *B01J 20/183* (2013.01); *B01D 2253/108* (2013.01); *B01D 2253/1085* (2013.01); *B01D 2253/11* (2013.01); *B01D 2253/304* (2013.01); *B01D 2253/308* (2013.01); *B01D 2256/12* (2013.01); *B01D 2256/16* (2013.01); *B01D 2258/06* (2013.01); *Y10T 428/2982* (2015.01)

(58) Field of Classification Search
USPC .......................... 502/63, 64, 68, 79, 411, 414
See application file for complete search history.

(56) References Cited

U.S. PATENT DOCUMENTS

| | | | |
|---|---|---|---|
| 3,119,659 A | 1/1964 | Taggart et al. | |
| 3,119,660 A | 1/1964 | Howell et al. | |
| 3,356,450 A | 12/1967 | Heinze | |
| 3,773,690 A | 11/1973 | Heinze et al. | |
| 4,818,508 A * | 4/1989 | Flank .................... | C01B 33/283 423/712 |
| 5,098,448 A | 3/1992 | Puppe et al. | |
| 5,868,818 A | 2/1999 | Ogawa et al. | |
| 5,962,358 A | 10/1999 | Hees et al. | |
| 6,478,854 B1 | 11/2002 | Kotagiri et al. | |
| 6,743,745 B2 | 6/2004 | Jaussaud et al. | |
| 7,820,869 B2 * | 10/2010 | Priegnitz ................ | B01J 20/183 585/820 |

FOREIGN PATENT DOCUMENTS

| | | |
|---|---|---|
| DE | 1 203 238 | 1/1964 |
| DE | 2 016 838 | 4/1970 |
| DE | 27 31 010 | 7/1977 |
| EP | 1142622 | 10/2001 |
| EP | 1 356 862 | 10/2003 |
| GB | 1 348 993 | 3/1974 |
| JP | 62-283812 | 12/1987 |
| JP | 3-295805 | 12/1991 |
| JP | 5-57184 | 3/1993 |
| JP | 5-163015 | 6/1993 |
| JP | 6-64916 | 3/1994 |
| JP | 2002-3208 | 1/2002 |
| WO | WO 2008/009845 | 1/2008 |

OTHER PUBLICATIONS

Pfenninger. "Industrial Zeolites for Adsorption Processes". *Industrial Applications of Zeolites Proceedings*, pp. 73-82, Brugge Belgium. (2000).
Costenoble et al. "Locations of Cations in Synthetic Zeolites X and Y", *Journal Chem. Soc.*, vol. 72, pp. 1877-1883 (1976).
Grandmougin et al. "New Trends in Air Separation Adsorbents", Ind. Appl. Zeol., Brugge, Belgium, pp. 93-104 (2000).
Pfinninger. "Manufacture and Use of Zeolites for Adsorption Processes". *Molecular Sieves 2 Structures and Structure Determination*, Springer-Verlag, pp. 164-198 (1999).
Pietsch. *Agglomeration Processes Phenomena, Technologies, Equipment.* Wiley-VCH, Weinheim, pp. 139-227.

* cited by examiner

*Primary Examiner* — Elizabeth Wood
(74) *Attorney, Agent, or Firm* — Hamre, Schumann, Mueller & Larson, P.C.

(57) ABSTRACT

The invention relates to a X-zeolite based adsorbent granulate with faujasite structure and a molar $SiO_2/Al_2O_3$ ratio of ≥2.1-2.5, wherein the granulate has an average transport pore diameter of >300 nm and a negligible fraction of meso-pores and wherein the mechanical properties of the granulate are at least the same as or better than the properties of an X-zeolite based granulate formed using an inert binder and the equilibrium adsorption capacities for water, $CO_2$ and nitrogen are identical to those of pure X-zeolite powder with a similar composition.

12 Claims, 5 Drawing Sheets

ADSORBENT GRANULATE AND METHOD FOR THE MANUFACTURE THEREOF

Figure 1:
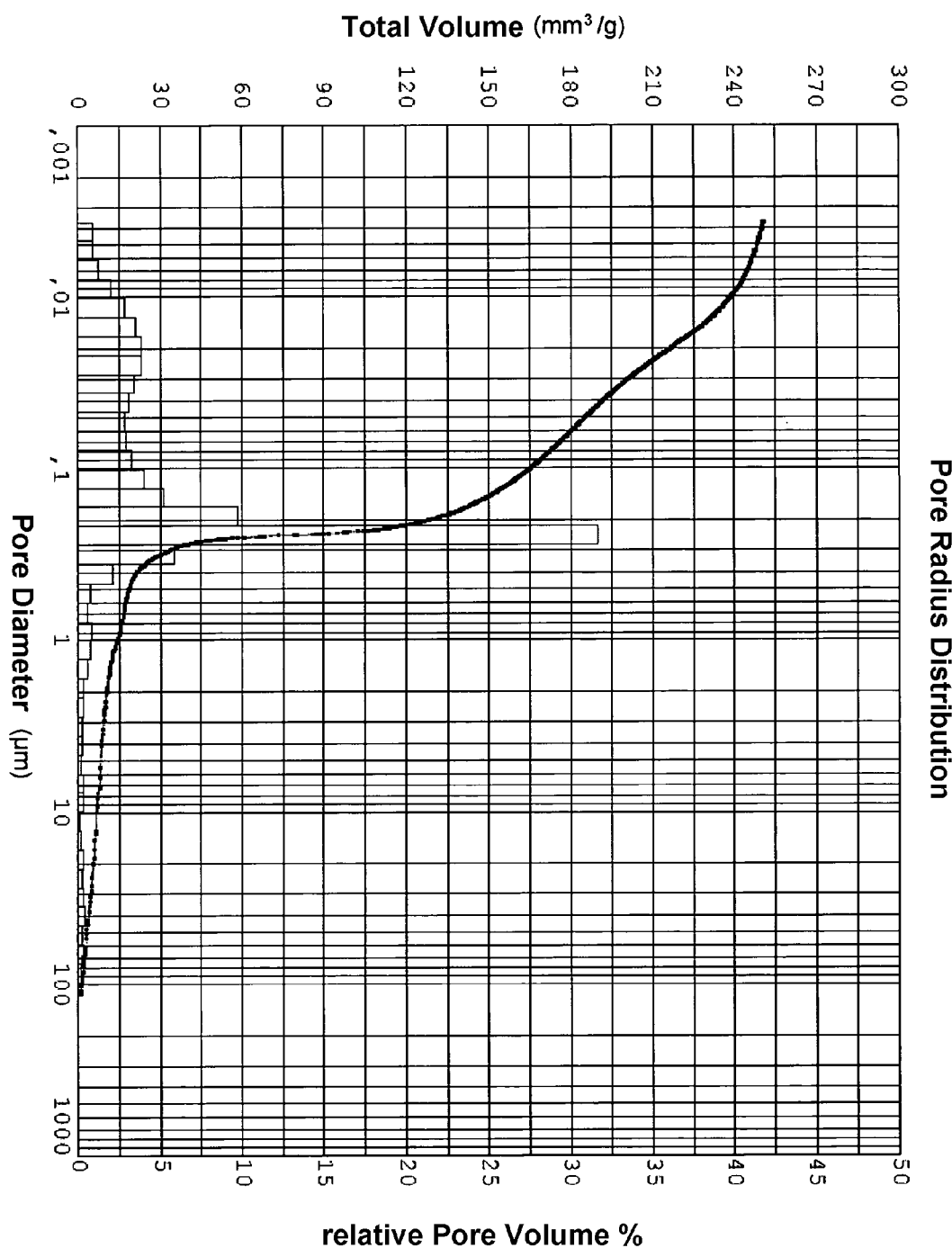

The invention relates to an adsorbent granulate based on zeolite with a faujasite structure and to a method for the manufacture thereof. The invention furthermore relates to using the granulate as an adsorption agent preferably for a selective separation, purification and drying of gases and liquids.

Adsorption agents based on zeolites with their specific properties like high chemical and thermal resistance, the existence of a homogenous channel pore system in the sub nanometer range and the development of specific interactions with adsorbed molecules based on a variable kation composition have an outstanding economic significance ["The Economics of Zeolites, Sixth Edition": Roskill Inf. Serv. Ltd, London, UK, 2003].

Besides rather classical applications in the fields of drying gases or liquids (static applications in insulating glass window, dynamic—regenerative applications in the field of crude oil and natural gas processing) this relates in particular to an application in the field of air fractionizing (cryogenic or non cryogenic), wherein adsorption agents based on faujasite-zeolite (type X) are being used on a large scale. [A. Pfenniger: Proc. Ind. Appl. Zeol., Brugge, 2000, 73.]. The term faujasite-zeolite defines a class of crystalline alumosilicates which were originally discovered as a natural mineral, however, only the synthetic products with said faujasite structures have gained economic relevance. Within these zeolites with faujasite structure another classification according to their composition (especially according to the molar ratio $SiO_2/Al_2O_3$) has become popular. Thus products with a ratio $SiO_21/Al_2O_3>3.0$ are designated as Y-zeolites and those with a $SiO_2/Al_2O_3<3.0$ as designated X-zeolites.

Another classification of the X-zeolites according to their $SiO_2/Al_2O_3$ ratio was historically derived from the development of different synthesis variants. Thus for a long time a "feasibility limit" for the X-zeolites was perceived at a $SiO_2/Al_2O_3$ ratio of approximately 2.46 [cf. e.g. U.S. Pat. No. 4,289,740]. These products are designated as 13X-zeolites. Later, however, also synthesis variants for X-zeolites with $SiO_2/Al_2O_3<2.6$ were developed. Thus, another differentiation is made between the so called LSX (low silicon-X) with a $SiO_2/Al_2O_3$ of 2.0+/−0.1 and MSX (medium silicon X)-zeolites (subsequently referred to in this patent application) with a $SiO_2/Al_2O_3$ ratio in the range >2.2 to approximately 2.45. The differentiations recited supra are useful since different synthesis methods are also being used for the different sub types. Thus, Y-type faujasite-zeolites are typically produced using a "pure" $SiO_2/Al_2O_3$ base component controlled, back feed of the base component from the "mother base" and possibly using a germination solution [e.g.: Costenoble u.a.: J/ Chem. Soc., Faraday Trans. I, 72 (1976), 1877], while the synthesis of LSX type faujasites-zeolites is generally performed in the presence of caustic potash solution besides the otherwise typical caustic soda solution [e.g. DE 2.731.010] or through the application of high pressures [U.S. Pat. No. 4,289,740]. The synthesis variants also differ significantly for a 13× with a $SiO_2/Al_2O_3$ ratio of approximately 2.5 from the synthesis variants for the production of the MSX.

Among the X types the "classic" 13X-type has the most significance based on volume. This relates to its use as an adsorption agent when processing raw air cryogenic air fractionizing devices for processing natural gas or also for non cryogenic oxygen enrichment through pressure change adsorption technology. However, there is an increasing trend to use the more powerful MSX-types for this application. LSX-types are being used (preferably as materials including Li) for the non cryogenic oxygen enrichment through pressure change adsorption technology described supra [M.-T. Grandmougin, R. Le Bec, O. Plee: Ind. Appl. Zeol., Brugge, 2000, 93].

The present invention relates to the preceding paragraph and relates preferably to granulates for molecule sieves based on X-zeolites, in particular X-zeolites with a molar $SiO_2/Al_2O_3>2.1-2.5$.

As a matter of principle one would like to use the adsorption properties (selectivity and capacity) of the respective "pure" zeolite component for all molecular sieves based on zeolites. While one could use zeolite molecular sieves in principle in the form of powder (primary form after synthesis) for static adsorption processes this, however, is not possible for dynamic processes (in a flowing medium) or only possible within limits, since excessive pressure drops over a powder pile render the method inoperative. Thus, in these cases one has to use form elements of any shape [A. Pfenniger in "Molecular Sieves—Science and Technology", Volume 2, Springer-Verlag, 1999, 163]. This touches on the basic problem for the conceptional configuration of adsorption agents for dynamic processes: On the one hand shaped bodies are required in order to be able to actually operate the processes in a dynamic manner. For known reasons these shaped bodies have to comply with particular minimum requirements with respect to their mechanical properties (dust, abrasion, pressure resistance, pouring weight). On the other hand shaped bodies are disadvantageous, since on the one hand side the active component is only provided in a thinned form in those formed bodies which include binder material and on the other hand the actually desired adsorption and desorption at the zeolite active component can be superimposed by the material transport processes in the formed bodies. Typically, the more mechanically stable the shaped body, the less disadvantageous are the material transport processes.

In the art shaped bodies in spherical form are being used, which are typically produced through layered granulation using a natural clay binder or extruded shaped bodies (cylinders, hollow cylinders, wound strands), typically using clay or other silicate binder materials [e.g.: W. Pietsch: Aggl. Proc.: Phen., Techn., Equipmt.: Wiley-VCH, Weinheim, 2002]

All recited shaped bodies have in common that as a function of the size of the shaped bodies, which in turn is determined by the application process and/or the volume of the binder material used, more or less strong influences of the material transport processes recited supra have to be considered. For example, typical granulates deformed with clay minerals and including zeolite always show a comparatively high percentage of pores in the portion of the transport pores (measured through mercury high pressure porosimetry) wherein the pores have a diameter <50 nm, (so called meso-pores), which are known to restrict the movablility of the molecules when transported to and from the adsorption centers in the zeolites.

A transport pore system is desirable for technical adsorption agents, wherein the system only includes a negligible percentage of meso-pores and a mean pore diameter which is as large as possible [D. Bathen, M. Breitbach: "Adsorptionstechnik", Springer-Verlag 2001, 13.]. The problem of the restricted movability of the molecules in the granulate of zeolite-containing molecular sieves deformed by clay binders can be alleviated by keeping the shaped bodies relatively small with respect to their dimensions (short transport paths), wherein in this case, however, the occurring pressure drop in an adsorption material compilation restricts the use of these small particles to low pouring heights or small devices. Large, but highly porous formed bodies can be used alternatively. It is an option to produce larger granulates bound with clay minerals with an improved transport pore system by adding a temporary pore forming agent to the granulate during deformation, wherein the pore forming agent can be typically broken down thermally and which is burned out after the deformation is formed and after a subsequent thermal treatment and wherein the pore forming agent leaves behind a respective pore forming system. [JP 62283812]

Unfortunately, the classic zeolite types to and in particular faujasites), however, are more sensitive with respect to thermal (hydrothermal) treatment. Thus, the thermal breakdown of the pore forming agents has to be performed, so that said thermal/hydrothermal loading of the granulate is avoided which causes additional complexity. The problem of thermal loading furthermore already relates to the binding of the typically used mineral binding agents (like e.g. Attapulgit) which have to go through a thermal treatment in the range of 500->600° C. [cf. e.g. U.S. Pat. No. 6,743,745].

In the art, however, in any case the problem of "thinning" the actual active component through an inert binder material, though it may be very porous, remains in any case for zeolite containing granulates which are bound by inert clay materials.

Methods are known in which it is being attempted to maximize the portion of active components in zeolite containing shaped bodies. Among them are in particular the methods for producing so called zeolite containing shaped bodies without binder material. When producing these products essentially two paths are being taken. On the one hand side a raw material which is suitable with respect to its deformability and chemical composition (mostly kaoline) is formed into a shaped body and the shaped body is subsequently converted into a material completely made from zeolite through thermal and/or chemical post treatment [e.g. U.S. Pat. No. 3,119,660]. This was already described decades ago preferably for zeolite type A. This is the case in particular because kaoline in its composition with reference to $SiO_2/Al_2O_3$ content comes very close to the composition of zeolite A. A direct conversion of formed kaoline over meta-kaoline into zeolite material of the faujasite (X-type) is not known, however, the conversion of a meta-kaoline formed body including sodium silicate and a pore forming agent into zeolite material of the faujasite type is known. The quality of the material thus obtained is only described by the content of zeolite type-X material of 73%-74%, determined by the x-ray method. U.S. Pat. No. 4,818,508 discloses a similar method; however the use of a mandatory pore forming agent is described herein in order to be able to assure the most complete transformation into zeolite material possible. Another option to produce binder-free zeolite containing formed bodies is comprised in deforming a powder of a certain zeolite-type with a suitable binder material, possibly a mix of several products, and subsequently converting the binder portion into zeolite. For the described method kaoline or meta-kaoline (a thermally activated kaoline) play an important role again [U.S. Pat. No. 3,119,659]. Also in this case kaoline/meta-kaoline used as binding agent is converted into zeolite material through subsequent thermal-chemical treatment.

Over a long period of time the binder-free zeolite including molecular sieves of Bayer AG were commercially available and known under the trade name "BAYLITH". These manufacturing methods are described in several patent documents (e.g. DE 1.203.238). In principle silica gel is used as a primary binding agent, wherein the silica gel is introduced into the system in different partially very complex ways. Mixtures of silica sol and magnesium oxide suspension or sodium silicate are described therein as gel forming systems. The silicate binder portion formed in this manner is then in turn converted into zeolite material in a subsequent step. It is typical for the method recited supra, wherein the binding agent portion is converted, that the binding agent, irrespective of the type of the zeolite component introduced, is intentionally converted into zeolite type A, thus also the product with the designation BAYLITH W894, wherein a type X material (faujasite) is introduced into the deformation as a zeolite. The result of the entire process is a shaped body which includes zeolite X and zeolite A [GB 1,348,993]. Another disadvantage of the method recited supra appears to be the porosity of the $SiO_2$ containing shaped bodies which is detrimental for further processing. Thus it is specifically indicated e.g. in [DE 2,016,838] that in particular for larger granulate diameters a relatively long working period is required for the solution for converting the $SiO_2$ portion into zeolite material before the actual conversion and a relatively long watering of the converting granulate is required in order to achieve on the one hand the most complete conversion of the $SiO_2$ content into zeolite material possible and on the other side to achieve the desired very open transport pore system. Typically in these products a significant percentage of transport pores with a diameter of less than 50 nm (meso-pores) is detectable, though this is much less than in granulates deformed with mineral clay based binder materials.

In the course of introducing the LSX-zeolites recited supra as powerful adsorption agents for non cryogenic oxygen enrichment through pressure change adsorption technology, there have been increased efforts since approximately the mid 1990's to also produce LSX-type molecular sieves which are free from binding agents. Thus, the method principles recited supra are transferred analogously. Thus, products produced according to the "BAYER" principle include type LSX and type A [U.S. Pat. No. 5,962,358].

For products which were produced on a kaoline/meta-kaoline base the illustrated results are quite contradictory. However, two detrimental trends are apparent. Either well crystallizing products, however, with an insufficient mechanical stability are obtained through the conversion of the kaoline/meta-kaoline into zeolite material, or mechanically stable products are obtained which besides the desired LSX structure also include other crystalline structures as "extraneous phase" (e.g. zeolite-A or zeolite-P), or in which the conversion into the desired structure is not performed up to the theoretically possible extent [cf. U.S. Pat. No. 6,478, 854 and citations included therein].

In conclusion it is appreciated that up to now there is apparently no efficient method for producing mechanically stable binder material free molecular sieve granulates based on X-zeolite, wherein the molecular sieve granulates are exclusively made from zeolite-X material. This relates at least to products with a $SiO_2/Al_2O_3$ ratio in a range >2.1-2.5.

Based on the described art it is the object of the invention to provide a low cost mechanically stable granulate based on a zeolite with faujasite structure and with a $SiO_2/Al_2O_3$ ratio in a range of >2.1-2.5, wherein the granulate includes an optimum transport system with a negligibly small portion of meso-pores and the highest possible mean diameter of the transport pores and a maximum content of zeolite material with a faujasite structure and an $SiO_2/Al_2O_3$ ratio in a range of >2.1-2.5. The granulate shall be usable as a highly efficient adsorption agent for technical adsorption processes.

The object is achieved by intensively mixing a powdery zeolite of the X-type with a molar $SiO_2/Al_2O_3$ ratio of >2.1-2.5 initially with a powdery thermally treated kaoline into this mix a solution including sodium hydroxide and sodium silicate is added and mixed intensively as well as the mixture thus produced is converted in a known manner with the addition of water into an evenly configured granulate. The granulate is dried and hydrated after the drying and treated with a solution of sodium hydroxide and sodium aluminate subsequently separated from this solution, washed, dried and tempered.

Surprisingly it was found that the shaped bodies thus produced have the desirable properties described supra to be achieved as objects of the invention and the disadvantages of existing/described products known in the art were eliminated. Particularly advantageous is the fact that the shaped bodies at least for water, carbon dioxide and nitrogen under comparable measurement conditions have the same weight adsorption capacities as the zeolite powder used as a base product (in activated condition). It is furthermore advantageous that the granulate does not have to be exposed to temperatures above 400° C. during its entire production process. This yields energy and thus cost savings and the zeolite structure is simultaneously treated gently.

The method described supra will be described in more detail now.

Dried X-type zeolite powder is used as base material now with a molar $SiO_2/Al_2O_3$ of >2.1-2.5, preferably with a molar $SiO_2/Al_2O_3$ ratio of 2.25-2.45. For this purpose said X-type zeolite is also usable when configured as a filter cake or slurry, wherein the respective moisture content has to be considered accordingly when computing the granulation mix.

The thermally treated kaoline used as another base component is generated from commercially available raw kaoline. It is essential to select this raw kaoline based on the content of non-kaolinitic components (in particular silica and feldspar). The content of these extraneous components which cannot be converted into zeolite material through further processing should be <mass-% preferably <1 mass-%.

The thermal treatment of this raw kaoline is preformed e.g. in a temperature range of 600° C. to 800° C., preferably in a range of 620° C. to 800° C. For a thermal loading the firing loss of the raw kaoline (one hour, 950° C.) is reduced from 14% to approximately 1%.

When necessary, the thermally treated kaoline has to be run through a milling process before further processing, since it has proven advantageous to use material with a mean particle size of <10 μm. The thermally treated kaoline is mixed with the zeolite component at a mass ratio of 1:1 to 1:5, preferably at a mass ratio of 1:2 to 1:3.5 respectively with reference to the absolutely water free material of the two components.

A solution including sodium hydroxide and sodium silicate is added to the mix and intensively mixed.

The mixing can be performed in known devices, like e.g. drum mixers, cyclone mixers, plow share mixers. In any case intense mixing of the components has to be assured.

The mixture recited supra is transferred into an evenly formed granulate (preferably ball granulate) through known techniques. For example mixing granulators, plate granulators or cyclone granulators can be used for equipment. When necessary water is added to the mixer during the granulating process.

The finished granulate is dried at temperatures of 10° C. to 100° C., preferably 40° C. to 70° C. The drying can be performed in a static ambient or inert gas atmosphere, however, it has proven advantageous that the granulate to be dried is flowed through by ambient air.

The dried granulate is subsequently hydrated with completely desalinated water in order to remove adhering dust particles and also to improve the accessibility of the transport pores for the zeolitization step. This process can be performed in a suitable stirring vessel or also in a column continuously flowed through with flushing water and filled with granulate. The ratio of water to granulate is preferably in a range of 5:1 to 40:1, preferably in the range of 8:1 to 20:1. The temperature of the water used for flushing should be in a range of 15'C to 40° C., preferably the watering is performed at ambient temperature. The treatment time is 5 minutes to 120 minutes, preferably 15 minutes to 60 minutes.

The watered granulate is subsequently treated with a solution including thinned sodium hydroxide solution with an addition of sodium aluminate solution. The treatment can be performed in a suitable stirring vessel or also in a column that is continuously flowed through by the solution and filled with the granulate. The ratio of solution to granulate is typically in a range of 5:1 to 40:1, preferably in a range of 8:1 to 20:1. The treatment temperature for this process step is in a range of e.g. 70" C to 95° C., preferably in a range of 75° C. to 90° C. The duration of the treatment is in a range of 8 to 24 hours and is determined in detail by the achieved degree of conversion of the previously non zeolite granulate portions into the desired zeolite material.

An "aging step" can be performed before this treatment using an alkaline solution with a similar composition or of the same solution, however at a lower temperature, preferably at ambient temperature over a time period of 0.5 to 24 hours, preferably 1 to 4 hours. After the treatment is completed the granulate is separated from the treatment solution and is washed with completely desalinated water in the same basic manner as described supra until a ph-value <12 is reached in the washing water. The used treatment solution from the conversion can be reconditioned and can be used for a subsequent treatment step with new granulate.

The washed granulate is separated from the washing water, dried and tempered. The recited thermal steps have to be performed under such conditions that a thermal/hydrothermal damaging of the material is excluded. Preferably devices are being used in which the granulate is continuously flowed through by dry air or inert gas and where the temperature can be increased incrementally. The duration of these thermal steps and the end temperature have to be selected, so that the material includes the required minimal humidity content (typically <1% mass). Thus, in the present situation maximum temperatures <450° C. are sufficient.

The subsequent embodiments and descriptions are intended to illustrate the basic principle of the invention.

Embodiment 1 (NaMSX-base component)

NaMSX powder manufactured through industrial production methods with subsequent properties was used as a base material:
$SiO_2/Al_2O_3$: approx. 2.35
$d_{50}$: approx. 3.5 μm
LOI (1 h, 950° C.): 21.4% mass Embodiment 2 (reference embodiment)

The material described in this embodiment is a molecular sieve produced in a conventional manner through industrial production techniques based on a NaMSX zeolite powder with a $SiO_2/Al_2O_3$ ratio of approx. 2.35 (re. embodiment 1) in a typical kernel size range of 1.6-2.5 mm. An Attapulgit (type Clarsol (Zeoclay) ATC NA, CECA) at a ratio of 17% mass with reference to the material in activated state was used as a binder material. The activation was performed in a conveyor belt oven with different temperature zones and a final temperature of 540° C.

Embodiment 3 (according to the invention)

In order to produce the base granulate, 733 g of zeolite NaMSX with a molar $SiO_2/Al_2O_3$ ratio of 2.35 and a firing loss of 21.4% (cf. embodiment 1) are mixed in a MTI-mixer with 223 g of a kaoline of the KS brand (vendor DVS Co. Limited/Ukraine composition cf. Table 1) pretreated at 700° C. for 1 hour in a muffle furnace with a firing loss of 1% dry material.

In a separate container 257 g of a 5% sodium hydroxide solution is mixed with 257 g of sodium silicate with a $SiO_2$ content of 27.5% and $Na_2O$ content of 8.3% through intense stirring.

In order to perform the granulation, 500 g of dry mix made form zeolite and meta-kaoline are put into the MTI-mixer and small amounts of the prepared solution of sodium silicate and sodium hydroxide are added until substantial granulation occurs in the super humid mixture disposed in the mixer. As soon as the granulate has reached the desired kernel size of approx. 1.5-3 mm, the mixture is powdered by adding smaller amounts of the dry mix including zeolite and calcinated kaoline. The obtained raw granulate is subsequently rounded out on a Rotorcoater. The moisture thus extracted is compensated by adding smaller amount of dry mix in order to prevent the particular granulate kernels from gluing together.

The obtained granulate is dried in a ventilated drying chest for 20 hours at 60° C. (layer thickness, approx. 2 cm) and subsequently sieved into 2 fractions.

In order to perform the zeolitization, 30 g of the 1.6-2.5 mm fraction of the granulate are hydrated 3 times with 200 ml of de-ionized water in order to remove all adhering dust particles. Subsequently the granulate is left for another 30 minutes under 300 ml of de-ionized water. The water is mostly poured out after this time period and replaced with the reaction mix for the zeolitization. The zeolitization is performed by adding 1.75 g of technical sodium aluminate hydroxide with a content of 19.5% each of $Na_2O$ and $Al_2O_3$ in order to produce 320 g of 3% sodium hydroxide. As described supra, this solution is added to hydrated humid base granulate and the mix made from granulate and reactive solution is aged for a period of 4 hr. at ambient temperature. During this time period the vessel is shaken lightly from time to time in order to limit in homogeneities in the composition of aging solution to a minimum.

After the completion of the aging process the reaction vessel is placed in a water bath and heated to a temperature of 83° C. Thus, the vessel is closed, so that evaporation of the liquid is essentially excluded. Subsequently the zeolitization reaction is performed at this temperature over a time period of 16 hr.

After the reaction time has expired the reaction vessel is removed from the water bath and the superfluous mother hydroxide is poured out after cooling down to 50° C. and discarded. Subsequently washing with approx. 200 ml deionized water is performed and the washing water is respectively removed by decanting. Subsequently the granulate is left under 300 ml of water for 5-10 min., thereafter sucked out with a BUECHNER funnel and washed again two times with 200 ml of de-ionized water each, evacuated hard and subsequently dried under an infrared lamp at approx. 60° C. for approx. 30 minutes.

In order to determined the x-ray crystallinity and the extraneous phase content 0.8 grams of the dried granulate are milled over for 10 minutes in a ball mill. The obtained powder is then placed on a sample carrier and checked for the crystallinity of the obtained zeolite type-X phase and for the non presence of crystalline extraneous phases using a defractometer type "D4 ENDEAVOR" made by Bruker-AXS GmbH, Karlsruhe using the software package "DIF-FRACplus". For the granulate produced according to this embodiment this yields and x-ray crystallinity of 90% and a lack of crystalline extraneous phases.

In order to determine the chemical composition, 1.2 g of the dry granulate is milled for a time period of approximately 20 min. in a ball mill and subsequently pressed to form a pressed spar-component according to SCHRAMM using 6 g of crystalline boric acid. The composition of this sample is then determined at an x-ray spectrometer of the type "S4 explorer" made by Fa. Bruker-AXS GmbH, Karlsruhe using the "SPEC plus" software package. Thus, the molar ratio of $SiO_2/Al_2O_3$ and $Na_2O/Al_2O_3$ is determined using a respective calibration while the content of other elements is obtained as a measurement without standard using the line library of the software package. The $SiO_2/Al_2O_3$ ratio thus determined ("module") is 2.34 and thus corresponds almost exactly to the module of the NaMSX powder used for producing the base granulate. Besides the main components $SiO_2$, $Al_2O_3$ and $Na_2O$, additionally the granulate includes 0.2% $TiO_2$, 0.2% $Fe_2O_3$ and respectively close to 0.1% CaO and $K_2O$.

The pressure resistance determined at the dried granulate was approximately 31N/ball.

In order to determine the equilibrium adsorption capacity for water 2 g of the dry granulate are activated at 450° C. for a period of approx. 1 hr. and the activated sample is subsequently cooled in an exsiccator over phosphorous pent oxide. Subsequently, the sample is placed into a weighing glass in an exsiccator with thinned sulfuric acid, whose vapor pressure at 25° C. corresponds to the partial pressure of water at 55% relative humidity. The exsiccator is evacuated until the sulfuric acid begins to boil and left in this condition for 24 hours. The adsorption capacity for water is then computed from the mass increase. Since no change in the sample mass was detected after another 24 hr. of dwelling time in the exsiccator, it was safe to presume that the adsorption capacity corresponds to the equilibrium adsorption capacity of the analyzed granulate sample for water vapor (result cf. Table 2).

In order to determine the adsorption capacity for nitrogen and carbon dioxide 0.4 g of the dry granulate is activated in a test tube in a sample preparation station type "VacPrep 061" made by the Micrometrics Company (USA) under vacuum for a period of 3 hrs. at 400° C. and subsequently measured at 25.0° C. in an adsorption measurement device type "Gemini 2370" made by the Micrometrics Company (USA) with the respective measurement gas as an adsorptive. The obtained adsorption values are included in Table 2 and within the measurement precision correspond to the values determined for the NaMSX powder used for producing the base granulate.

Embodiment 4 (according to the invention)

A meta kaoline powder is used for producing larger amounts of the base granulate for zeolitization, wherein the meta kaoline powder is obtained by calcinating the kaoline with the brand "Super Standard Porcelain" made by the IMERYS Co. in a rotating tube kiln at a maximum product temperature of approx. 720° C. and a dwelling time of approx. 1 hr. with subsequently milling in a jet mill to a defined mean particle size. Thus the composition of the base kaoline is included in Table 1. Though the material is almost silica free, it apparently includes significant amounts of potassium feldspar. This can be derived from the relatively high $K_2O$ content and also from the presence of the respective reflexes in the x-ray diffractogram.

For producing base granulate respectively 24.1 kg NaMSX powder with a firing loss of 21.4% and a module of 2.35 (cf. Embodiment 1) are mixed with 7.4 kg of the meta-kaoline powder described supra in an EIRICH mixer of the R7Type in a dry state. This dry mix is then slowly complemented with respectively 8.5 kg of a solution of 7.7 kg of sodium silicate (with a $SiO_2$ content of 27.5% and a $Na_2O$ content of 8.3%) and 0.8 kg of a 48% sodium hydroxide. This premix is then mixed until a substantial degree of homogeneity is achieved. This process is repeated several times in order to obtain sufficient amounts of granulatable premix.

In order to begin the granulation the last of the produced 40 kg batches of the premix is left in the EIRICH mixer and the granulate formation is initiated by slowly adding water. After the granulate formation begins, a dusting with the premix and a humidification with water is performed in an alternating manner until the desired granulate spectrum of approx. 1.5-3.0 mm is reached. The completely granulated mixture is then separated in a sifting device into a usable kernel fraction, a under size kernel fraction and an oversize kernel fraction. The oversize kernel fraction is then subsequently crushed in an EIRICH mixer and fed back into the granulation process together with the under size kernel fraction as reclaimed material. The subsequent granulation process is then performed respectively using premix and reclaimed material.

The usable kernel fraction of the obtained fresh granulate is then dried in a chamber dryer with air circulation in a layer thickness of approx. 2 over the course of 24-36 hours and used as a base granulate for the subsequent zeolitization.

In order to perform the zeolitization 8.5 kg of dry granulate are placed into a flow through reactor with a removeable insert with approximately 15 cm interior diameter and approx. 70 cm useable height and watered for 30 min. with de-ionized water in a flow cycle. In parallel thereto a reactive solution is prepared in a separate storage container, wherein the solution includes 200 liters 3% sodium hydroxide and 1.1 kg of a technical sodium aluminate hydroxide with a content of 19.5% $Na_2O$ and $Al_2O_3$ respectively. This reactive solution is then pumped over the pre-washed granulate with a temperature of 23° C. and a flow through velocity of 200 l/h for 2 hours. After this aging period the reactive solution is heated to 83° C. with vapor through a bypass heat exchanger and the zeolitization is performed over a period of 16 hours. After this time period has expired the mother base is drained and the granulate is washed with three portions of 200 liters of de-ionized water each.

The humid granulate is then removed from the reactor together with the insert and dried for approx. 8 hrs. in an air flow at a maximum temperature of 50° C. After the drying an incremental activation up to 380° C. is performed. The granulate obtained has a residual water content of <1.0%. The modulus of the granulate determined through x-ray florescent analysis is 2.37 and thus approx. corresponds to the value for the NaMSX powder which was used to produce the base granulate.

For the granulate produced according to this embodiment an x-ray crystallinity of 86% and a lack of crystalline extraneous phases is detected.

The data regarding the adsorption properties and the pressure resistance and regarding the granulate obtained are included in Table 2. The obtained adsorption properties correspond approximately to the adsorption properties of the NaMSX powder used for producing the base granulate. The slightly lower adsorption capacity for carbon dioxide compared to embodiment 1 can be explained by the detectable content of the potassium feldspar in the meta-kaoline used. Apparently, this potassium feldspar is not converted into the zeolite phase or not sufficiently converted.

TABLE 1

Composition for the kaolines in delivered form as used for producing the base granulates

| Kaoline | Content (in % m/m) of: | | | | | | |
|---|---|---|---|---|---|---|---|
| | $SiO_2$ | $Al_2O_3$ | $Na_2O$ | $K_2O$ | $TiO_2$ | $Fe_2O_3$ | $H_2O$ |
| KS | 45.1 | 38.1 | 0.1 | 0.3 | 0.7 | 0.7 | 14.5 |
| Super Standard Porcelain | 47.8 | 36.0 | 0.2 | 1.4 | 0.02 | 0.5 | 13.4 |

TABLE 2

Important parameters for the granulates included in the embodiments 1-4 compared with the 13-X powder used for producing the base granulates

| Embodiment | Crystallinity (XRD) % i/i | Module | WAC (static) % m/m | $CO_2$-Adsorption (Ncm$^3$/g) at 25° C. and | | | $N_2$ Adsorption (Ncm$^3$/g) at 25° C./ 750 Torr | Pressure Resistance N/Ball |
|---|---|---|---|---|---|---|---|---|
| | | | | 1.8 T | 34 T | −250 T | | |
| 1 | 98 | 2.35 | 30.8 | 34.5 | 80.0 | 118.0 | 10.2 | — |
| 2 | 81 | (2.35) | 27.6 | 26.0 | 63.5 | 95.5 | 8.2 | 35 |
| 3 | 90 | 2.34 | 30.3 | 34.9 | 80.4 | 118.4 | 10.2 | 31 |
| 4 | 90 | 2.37 | 30.9 | 34.2 | 78.5 | 116.3 | 10.1 | 37 |

Comment:
WAC - water adsorption capacity at 25 C.° and 55% relative humidity

Based on the results according to Table 2 it can be determined that the products according to the invention with respect to their mechanical stability are at least comparable to conventional products. The crystallinities of the portion of zeolite material in the granulate determined through x-ray diffractrometry for the products according to the invention are higher than comparable conventional products. Surprisingly, adsorption capacities can be found at the products according to the invention which are substantially identical to the adsorption capacities measured for pure powder. This indicates that the products according to the invention are actually made from almost 100% zeolite material of the desired structure. The apparent contradiction between zeolite material contents in the granulate determined on the one hand side through x-ray diffractrometry and one the other hand side through adsorption measurements can be explained in that a portion of the zeolite material detected through adsorption is not detectable through x-ray diffactrometry, thus it is "x-ray amorphous". This situation occurs when the respective crystallites are too small to cause x-ray diffraction. Thus, it can be presumed that during the "zeolitization" with reference to embodiments 3 and 4 approx. 10% of the zeolite material has been created with particle sizes below the detection threshold of x-ray diffractrometry, thus nano particles which according to all current experiences should have advantageous properties in adsorption applications.

Figure 2:
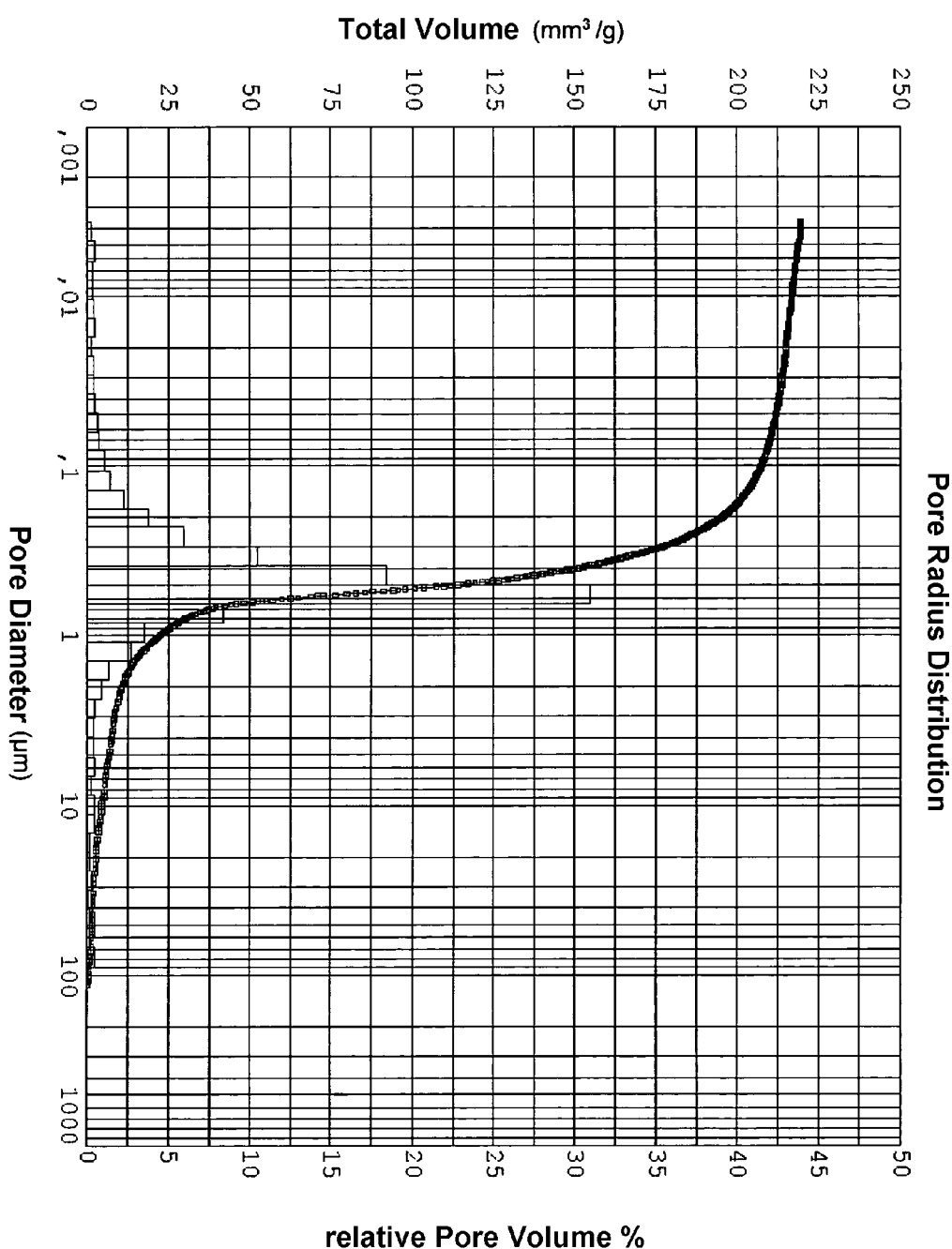
Figure 3:
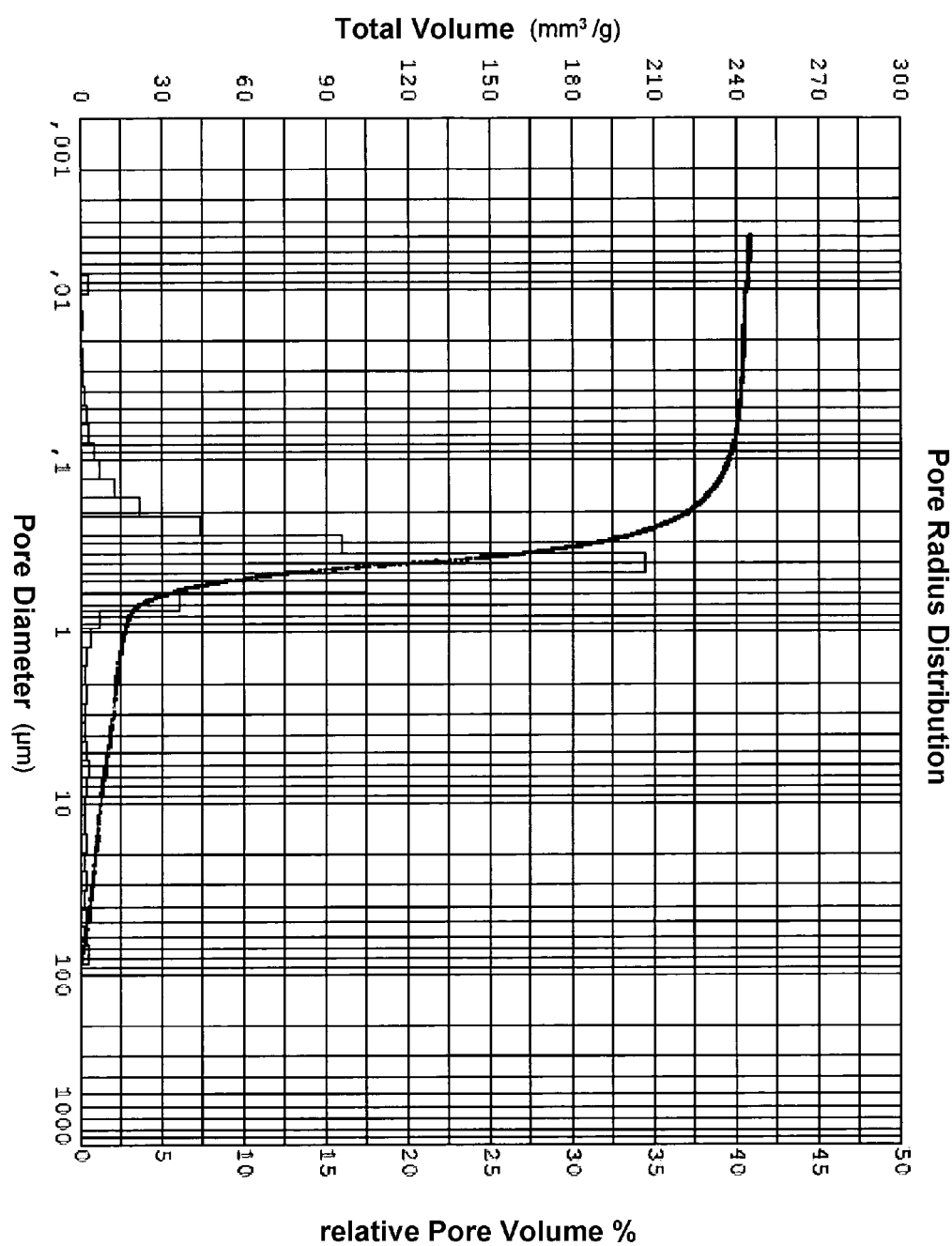
Figure 4:
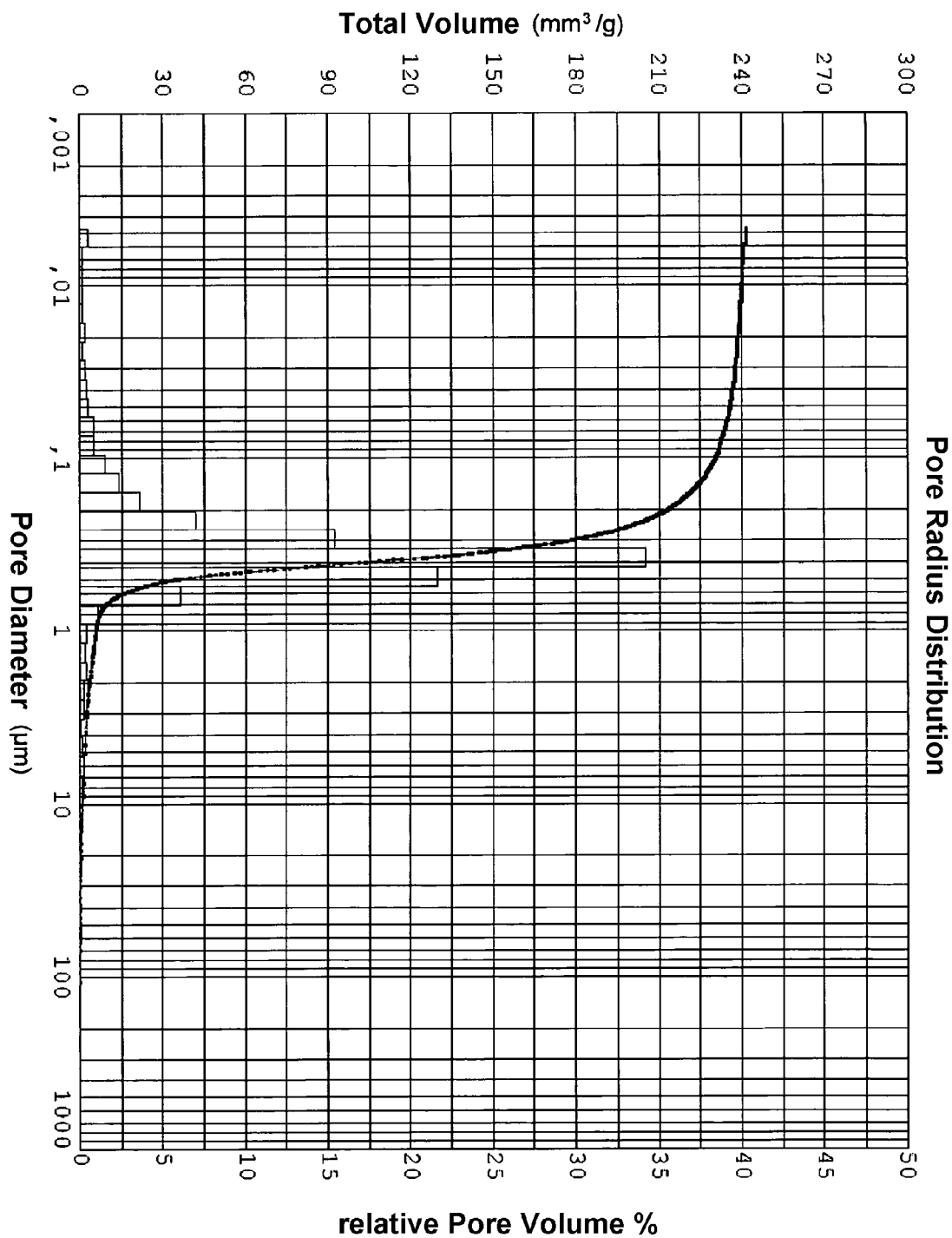
Figure 5:
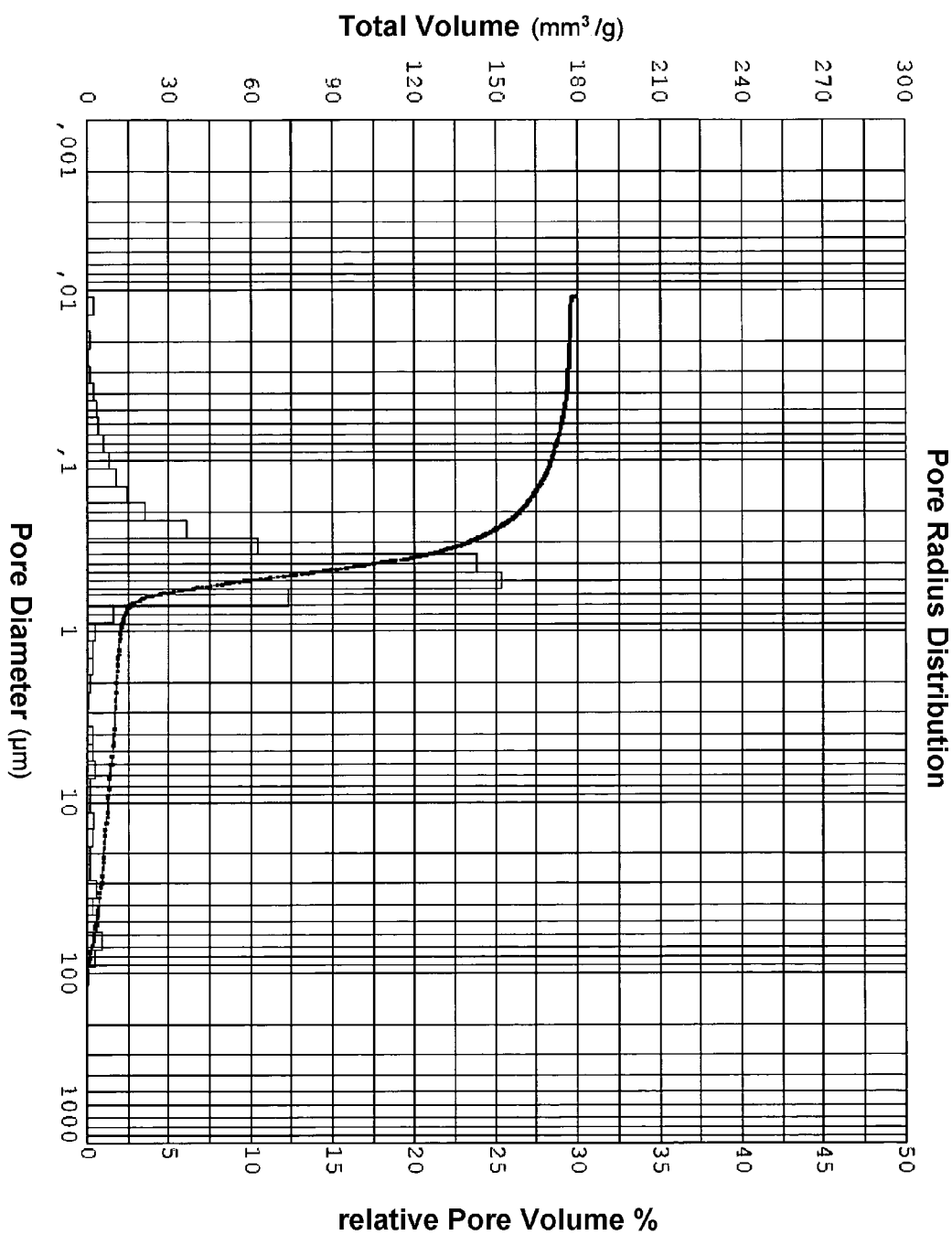

FIGS. 1 through 5 illustrate pore radius distributions of the products according to embodiments 2-4 measured through mercury porosimetry. The measurements were performed with the equipment combination PASCAL P140, P440 made by the Porotec Co. Initially interfering gases were removed from the sample surface in a vacuum. Thereafter an incremental pressure increase up to 400 kPa was performed in the low pressure porosimeter P140. Thereafter the sample is put into the high pressure station at ambient pressure and the pressure is increased up to 400 mPa. Through a particular method (PASCAL) the pressure change gradients are varied as a function of the pressure range and as a function of the mercury adsorption by the probe. The mercury volume penetrating the probe is registered and a pore size distribution is determined. Based on a comparison of FIGS. 2-5 with FIG. 1 it can be determined that the products according to the invention only include a negligibly small percentage of undesirable transport pores with a diameter <50 nm (Mesopores). The properties are already formed during the production of the base granulate (fresh granulate cf. FIG. 3). The subsequent process steps (watering, zeolitization, washing, drying and tempering, cf. FIGS. 4 and 5) lead to movement of the transport pore spectrum to larger diameters and/or to an elimination of still existing meso-pores through e.g. crystallization processes. In particular the products according to the invention have significant advantages in their application in dynamic adsorption processes based on the transport pore system over conventional products, in particular for adsorption processes with a quick change between adsorption and desorption.

The invention claimed is:

1. A method for producing an adsorption agent granulate, comprising:
   (a) mixing a X-type zeolite having a molar $SiO_2/Al_2O_3$ ratio of ≥2.1-2.5 in a form of a dry powder, filter cake or slurry at a weight ratio of 1:1 to 5:1 with a thermally treated kaoline having a mean particle diameter in a range of ≤10 μm to obtain a first mixture,
   (b) mixing the first mixture with a second mixture that consists of sodium hydroxide and sodium silicate solution to obtain a third mixture, and
   (c) forming a granulate from the third mixture, wherein the granulate is subjected to a drying process and subsequently hydrated with completely de-salinated water and treated with a first sodium aluminate solution at temperatures in a range of 70° C.-90° C. over a time period of up to 24 hours, and wherein the granulate thus treated is separated from the solution, washed, dried and tempered,
   wherein (b) is performed directly after (a),
   wherein (c) is performed directly after (b),
   wherein (a)-(c) are performed so as to produce an adsorption agent granulate consisting of the X-type zeolite, and
   wherein the thermally treated kaoline is a kaoline that has been thermally treated at a temperature in a range of 600° C. to 850° C.

2. A method according to claim 1, wherein a ratio of washing water to granulate is in a range of 5:1 to 40:1.

3. A method according to claim 1, wherein the hydrated granulate is treated with a solution comprising a diluted sodium hydroxide solution with an addition of sodium aluminate solution.

4. A method according to claim 3, wherein a ratio of the solution comprising the diluted sodium hydroxide solution with the addition of sodium aluminate solution to the granulate is in a range of 5:1 to 40:1.

5. A method according to claim 1, wherein a duration of the treatment with the sodium aluminate solution is determined by an obtained degree of conversion of non zeolitic granulate components into a desired zeolite material.

6. A method according to claim 1, wherein before performing the treatment with the first sodium aluminate solution, an aging step with a second aluminum solution is performed over a time period of 0.5-24 hours at a temperature that is lower than that of the treatment with the first sodium aluminate solution.

7. A method according to claim 1, wherein the thermally treated kaoline comprises ≤5 mass % non kaolinitic material.

8. A method according to claim 2, wherein the ratio of washing water to granulate is in a range of 8:1 to 20:1.

9. A method according to claim 4, wherein the ratio of the solution comprising the thinned sodium hydroxide solution with the addition of sodium aluminate solution to the granulate is in a range of 8:1 to 20:1.

10. A method according to claim 6, wherein the aging step is performed for 1-4 hours.

11. A method for producing a zeolite-based adsorbent granulate, comprising the steps of:
   (a) mixing a X-type zeolite having a molar $SiO_2/Al_2O_3$ ratio of ≥2.1-2.5 in a form of a dry powder, filter cake or slurry at a weight ratio of 1:1 to 5:1 with a thermally treated kaoline having a mean particle diameter in a range of ≤10 μm to obtain a first mixture,
   (b) mixing the first mixture with a second mixture that consists of sodium hydroxide and sodium silicate solution to obtain a third mixture,
   (c) forming a granulate from the third mixture, drying the granulate at temperatures of 10° C. to 100° C. to obtain a dried granulate, hydrating the dried granulate with completely desalinated water to obtain a first watered granulate, treating the first watered granulate with a sodium aluminate hydroxide solution at temperatures in a range of 70° C.-90° C. over a time period of 8 to 24 hours to obtain a zeolite granulate, washing the zeolite granulate with completely desalinated water until a less than 12 of pH value is reached in the washing water to obtain a second watered granulate, drying and tempering the second watered granulate separated, wherein the thermally treated kaoline is generated from a raw kaoline that comprises <1 mass % non kaolinitic material, all the steps of the method are performed at temperatures lower than 450° C. during production of the adsorption agent granulate, wherein (b) is performed directly after (a), wherein (c) is performed directly after (b), wherein (a)-(c) are performed so as to produce an adsorption agent granulate consisting of the X-type zeolite.

12. The method of claim 11, wherein all the steps of the method are performed at temperatures lower than or equal to 400° C. during production of the adsorption agent granulate.

* * * * *